United States Patent Office 3,567,652
Patented Mar. 2, 1971

---

3,567,652
COPPER CHROMITE CATALYST FOR PREPARING 2,3-DIHYDRO-PARA-DIOXIN
Rodney D. Moss, Indianapolis, Ind., and Janet N. Paige, Midland, Mich., assignors to The Dow Chemical Company, Midland, Mich.
No Drawing. Original application May 26, 1966, Ser. No. 553,061, now Patent No. 3,413,312, dated Nov. 26, 1968. Divided and this application May 17, 1968, Ser. No. 739,583
Int. Cl. B01j *11/82*
U.S. Cl. 252—440                    1 Claim

ABSTRACT OF THE DISCLOSURE

The invention relates to a new and improved process for preparing 2,3-dihydro-para-dioxin. More particularly the present invention concerns the preparation of 2,3-dihydro-para-dioxin by the simultaneous dehydrogenation and dehydration of diethylene glycol in the liquid phase using a copper chromite catalyst promoted with an alkali metal acid sulfate or an alkali metal pyrosulfate.

CROSS REFERENCE TO RELATED APPLICATIONS

This application is a division of our application Ser. No. 553,061, filed May 26, 1966, now U.S. Patent No. 3,413,312.

The simultaneous dehydrogenation and dehydration of diethylene glycol to 2,3-dihydro-para-dioxin according to the process of the present invention can be achieved by contacting the glycol in the liquid phase with a copper-containing chromium dehydrogenation catalyst in the presence of a promoter selected from the group consisting of aluminum oxide ($Al_2O_3$); alkali metal acid sulfates such as potassium acid sulfate ($KHSO_4$) and sodium acid sulfate ($NaHSO_4$); alkali metal pyrosulfates such as potassium pyrosulfate ($K_2S_2O_7$); and, calcium fluoride ($CaF_2$), and at a temperature above about 200° C. The reaction products are conveniently separated from the reaction mixture continuously and as formed by permitting the reaction products to distill overhead from the reaction mixture.

The catalysts employed in effecting the simultaneous dehydrogenation and dehydration of the ethylene glycol to 2,3-dihydro-para-dioxin according to the process of the present invention are the various copper-chromite catalysts containing from about 15 to about 80% by weight of copper and from about 10 to about 45% chromium. Representative of the commercially available catalysts which have been employed and found successful are Harshaw 0401P, 1402P, 1106P, 1800P, 1802P, 2000P, 0202P. These catalysts contain from 31.2% to 65.5% copper and from 11.6% to 41% chromium. The 1106P catalyst is a barium-promoted catalyst. The Girdler catalysts, all commercially available, which are effective are Girdler T873A, T1113, T1136, T1060, all of which contain copper in the amount from 29% to 44% and chromium in the amount from 25% to 30%. The T873A catalyst is a barium-promoted copper chromite. Several procedures are reported in the literature for preparing copper chromites and these have been found satisfactory for the preparation of copper chromite catalysts useful in accordance with the present invention.

The promoters for the copper chromite catalysts described above which have enhanced the yield of the desired dioxin product when employed in accordance with the present invention are the alkali metal acid salts of sulfuric acid, the alkali metal pyrosulfates, calcium fluoride and aluminum oxide. The copper chromite promoted catalyst which when employed in accordance with the present invention yields the improved results is one having from about 10 to about 60 percent by weight promoter based on the total weight of the copper chromite and promoter. The amount of activated catalyst which effectively converts the glycol to the dioxin is from about 0.1 gram of catalyst per mole of glycol and preferably about 0.5 to 4.5 grams of catalyst per mole of glycol. Amounts greater than 4.5 grams can be employed but normally do not increase the conversion sufficiently to warrant its use.

The simultaneous dehydrogenation and dehydration of the diethylene glycol to produce the corresponding dioxin according to the process of the present invention can be conveniently effected at temperatures ranging from about 200° C to about 300° C., and preferably from about 235° C. to about 250° C.

Atmospheric pressure is usually employed in carrying out the process of the present invention. However, pressures both above and below atmospheric pressure can also be employed.

The following examples are set forth for purposes of illustration but are not to be construed as limiting the invention in any manner.

Example 1

Copper chromite (15 g. of Harshaw 1800P), potassium acid sulfate (10 g.), and diethylene glycol (1060 g.≅10 moles) were placed in a 3-necked, 2 liter flask equipped with a stirrer. The flask was connected to a vacuum-jacketed Vigreaux column. After the entire system had been purged with nitrogen, the mixture was heated with stirring. When the pot temperature reached 235°, the products began to distill; steady hydrogen evolution started shortly before liquid began to distill. A reflux ratio of 3:1 was used; the head temperature was about 125°. After 12 hours of distillation, the reaction was complete (i.e., hydrogen evolution ceased and nothing more distilled). The distilled product was analyzed, and diethylene glycol was recovered from the residue. Results (based on VPC analyses): Conversion was 36.5% with 86.5% yield of 2,3-dihydro-p-dioxin.

Example 2

In the manner of Example 1 employing 15 grams of various commercial copper-chromite catalysts and 10 grams of potassium acid sulfate as the promoter, and the same 10 mole reaction series, the following yields of dioxene were obtained.

| | Percent | |
|---|---|---|
| Catalyst percent Cu, Cr | Conversion | Yield |
| Harshaw 0202P 65.5; 11.6 | 44.5 | 87.0 |
| Harshaw 1800P 40.8; 32.2 | 36.5 | 86.5 |
| Harshaw 1802P, more porous form of 1800P | 34.5 | 71.5 |
| Harshaw 2000P 43.2; 28.1 | 32.5 | 84.5 |
| Harshaw 0401P 32.8; 30.0 containing Ba | 34.0 | 80.5 |
| Harshaw 1402P 32.0; 41.0 | 41.0 | 76.5 |
| Harshaw 1106P 31.2; 29.8 containing Ba | 30.0 | 77.0 |
| Girdler T-1060 35.8; 28.7 | 35.5 | 81.5 |
| Girdler T-873A 31.8; 27.4 containing Ba | 45.0 | 70.5 |
| Girdler T-1136 29.0; 25.0 containing Ba | 38.0 | 72.5 |
| Girdler T-1113 44.0; 30.0 | 39.0 | 66.5 |

Example 3

In the manner of Example 1 employing two different commercial copper chromite catalysts in various amounts with various amounts of potassium acid sulfate, the following yields of dioxene were obtained when a series of 10 mole reactions was run.

| Catalyst, gram catalyst | Grams, KHSO₄ | Percent Conversion | Yield |
|---|---|---|---|
| 1800P, 15 | 10 | 35.0 | 85.5 |
| 1800P, 22.5 | 10 | 42.0 | 77.5 |
| 1800P, 30 | 10 | 47.5 | 75.0 |
| 1800P, 45 | 10 | 60.0 | 77.5 |
| 1800P, 30 | 20 | 31.0 | 62.5 |
| 1800P, 15 | 5 | 57.5 | 79.2 |
| 1800P, 15 | 2.5 | 68.0 | 58.5 |
| 0202P, 15 | 10 | 44.5 | 87.0 |
| 0202P, 15 | 15 | 37.0 | 80.5 |
| 0202P, 15 | 5 | 65.8 | 78.5 |

We claim:

1. A composition of matter consisting essentially of a copper-chromite catalyst containing from about 15% to about 80% by weight of copper and from about 10% to about 45% by weight chromium, promoted with from about 10% to about 60% by weight, based on the total weight of the copper-chromite and promoter, of a member selected from the group consisting of alkali metal acid sulfate and alkali metal pyrosulfate.

References Cited

UNITED STATES PATENTS

| | | | |
|---|---|---|---|
| 2,223,303 | 11/1940 | Lazier | 252—467X |
| 2,900,395 | 8/1959 | Guest et al. | 252—467X |
| 2,964,579 | 12/1960 | Kirsch et al. | 252—467X |
| 2,982,789 | 5/1961 | Smith et al. | 252—467X |
| 3,259,453 | 7/1966 | Stiles | 252—440X |
| 3,333,011 | 7/1967 | Anello et al. | 252—441X |
| 3,340,311 | 9/1967 | Chitwood et al. | 252—440X |

PATRICK P. GARVIN, Primary Examiner

U.S. Cl. X.R.

252—441, 465